US 8,675,558 B2

(12) United States Patent
Zhu et al.

(10) Patent No.: US 8,675,558 B2
(45) Date of Patent: Mar. 18, 2014

(54) CQI DEFINITION FOR TRANSMISSION MODE 9 IN LTE-ADVANCED

(75) Inventors: Yuan Zhu, Beijing (CN); Qinghua Li, San Ramon, CA (US); Xiaogang Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 13/167,941

(22) Filed: Jun. 24, 2011

(65) Prior Publication Data
US 2012/0176965 A1 Jul. 12, 2012

Related U.S. Application Data

(60) Provisional application No. 61/430,879, filed on Jan. 7, 2011.

(51) Int. Cl.
*H04W 4/00* (2009.01)
(52) U.S. Cl.
USPC ........................................ 370/328; 455/422.1
(58) Field of Classification Search
USPC .................. 370/328, 311; 455/422.1
See application file for complete search history.

(56) References Cited

U.S. PATENT DOCUMENTS

| 2010/0142466 A1 | 6/2010 | Palanki et al. | |
|---|---|---|---|
| 2010/0238824 A1 | 9/2010 | Farajidana et al. | |
| 2011/0032839 A1* | 2/2011 | Chen et al. ..................... | 370/252 |
| 2011/0292851 A1* | 12/2011 | Fong et al. ..................... | 370/311 |
| 2012/0028628 A1* | 2/2012 | Frenger et al. ............. | 455/422.1 |

FOREIGN PATENT DOCUMENTS

| WO | 2012/094150 A2 | 7/2012 |
|---|---|---|
| WO | 2012/094150 A3 | 7/2012 |

OTHER PUBLICATIONS

"Cross carrier power control with group TPC commands", R1-106094, 3GPP TSG- RAN WGI Meeting #63, Nov. 19, 2010.
International Search Report and Written Opinion Received for PCT Application No. PCT/US2011/066295, Mailed on Aug. 1, 2012, 9 pages.
"On non-PMI based feedback in Rel-10," R1-106313, 3GPP TSG WG1 Meeting #63, Nov. 19, 2010.
R1-100853, "Channel reciprocity in FDD systems including systems with large duplex distance", Ericsson, ST-Ericsson, TSG-RAN WG1 #60, San Francisco, USA, Feb. 22-26, 2010, 5 pages.
Alcatel-Lucent, et al., R1-105801, "Way Forward on CQI/PMI reporting enhancement on PUSCH 3-1 for 2, 4 and 8 TX", 3GPP TSG RAN WG1 62bis, Xian, China, Oct. 11-15, 2010, 3 pages.
R1-106313, "On non-PMI based feedback in Rel-10", RAN1 WG1# 63, CMCC, CATT, Jacksonville, USA, Nov. 15-19, 2010, 4 pages.
"Corrections to Rel-10 LTE-Advanced features in 36.213", 3GPP TSG-RAN Meeting #64, Taipei, Taiwan, Feb. 21-25, 2011, pp. 1-106.
International Preliminary Report on Patentability Received for PCT Patent Application No. PCT/US2011/066295, mailed on Jul. 18, 2013, 7 pages.

* cited by examiner

*Primary Examiner* — Wei Zhao
(74) *Attorney, Agent, or Firm* — Cool Patent, P.C.; Joseph P. Curtin

(57) ABSTRACT

An evolved Node B (eNB) in a 3GPP LTE-based network receives Channel State Information-Reference Signal (CSI-RS) from a User Equipment (UE) that is configured with Precoder Matrix Indicator (PMI) disabled. A channel is estimated between the eNB and the UE for link adaptation in Transmission Mode 9 (TM9) based on CSI-RS by the UE and SRS by the eNB. CQI is calculated at UE such that if a number of CSI-RS antenna ports equals one, TM9 transmission from the eNB to the UE uses a predetermined single antenna port. If the number of CSI-RS antenna ports equals two, TM9 transmission from the eNB to the UE uses transmit diversity. If the number of CSI-RS antenna ports does not equal one or two, TM9 transmission from the eNB to the UE uses spatial multiplexing based on a rank-1 precoder that is determined from a wideband channel covariance matrix R.

17 Claims, 3 Drawing Sheets

CQI DEFINITION FOR TRANSMISSION MODE 9 IN LTE-ADVANCED

CROSS-REFERENCE TO RELATED PATENT APPLICATION

The present patent application is related to and claims priority to U.S. Provisional Patent Application Ser. No. 61/430,879, filed Jan. 7, 2011, entitled "CQI Definition for Transmission Mode 9 in LTE-Advanced," and invented by Y. Zhu et al., the disclosure of which is incorporated by reference herein.

BACKGROUND

In Transmission Mode 8 (TM8) of the LTE-Advanced standard, an evolved Node B (eNodeB or eNB) conventionally determines the Channel Quality Indicator (CQI) for the Physical Downlink Shared Channel (PDSCH) as Single Antenna Port, port 0, if the User Equipment (UE) is configured without Precoding Matrix Indicator/Rank Indicator (PMI/RI) reporting and if the number of Physical Broadcast Channel (PBCH) antenna ports is one. Otherwise, a diversity transmission technique is used. That is, for TM8, an eNodeB determines CQI for PDSCH based a non-beamformed CQI from the UpLink (UL) control channel signaling feedback from a UE. The eNodeB estimates CSI from the UpLink (UL) Sounding Reference Signals (SRS) sent from the UE, and the difference between the non-beamformed CQI and the beamformed CQI is compensated by eNodeB.

This conventional approach for TM8 is logical particularly if the UE is only able to see the downlink channel with a reduced column vector from the downlink link adaptation reference signal or if the total number of downlink transmission antennas is less than or equal to 2, in which case the gain from beamforming is nonexistent or is insignificant.

DESCRIPTION OF THE DRAWING FIGURES

Claimed subject matter is particularly pointed out and distinctly claimed in the concluding portion of the specification. Such subject matter may, however, be understood by reference to the following detailed description when read with the accompanying drawings in which:

Figure 1:
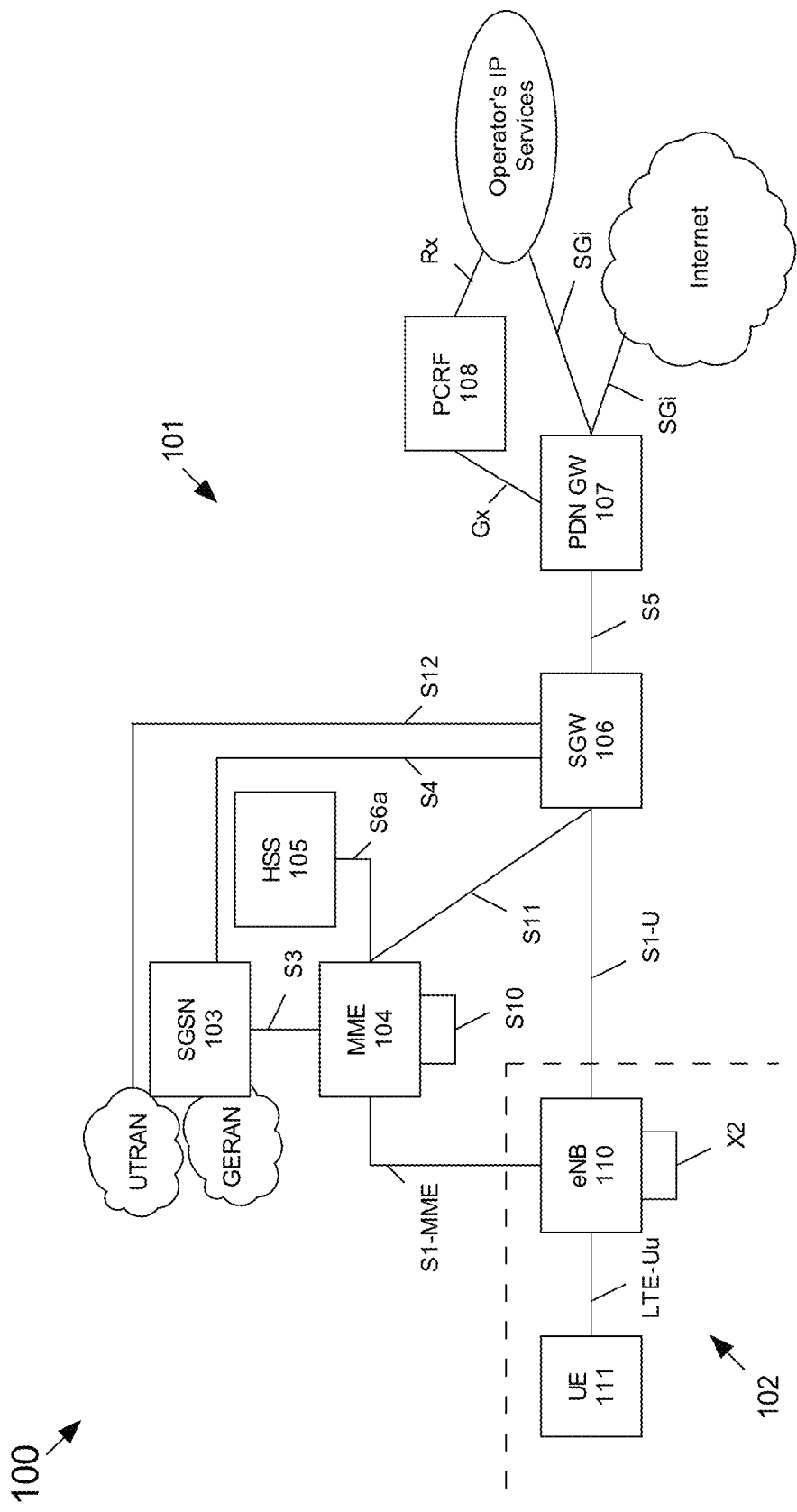
FIG. 1 shows a block diagram of the overall architecture of a 3GPP LTE network including network elements and standardized interfaces.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled may, however, also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over" may, however, also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other. As used herein, the word "exemplary" means "serving as an example, instance, or illustration." Any embodiment described herein as "exemplary" is not to be construed as necessarily preferred or advantageous over other embodiments.

FIG. 1 shows a block diagram of the overall architecture of a 3GPP LTE network 100 that includes network elements and standardized interfaces. At a high level, network 100 comprises a core network (CN) 101 (also referred to as the evolved Packet System (EPC)), and an air-interface access network E-UTRAN 102. CN 101 is responsible for the overall control of the various User Equipment (UE) connected to the network and establishment of the bearers. E-UTRAN 102 is responsible for all radio-related functions.

The main logical nodes of CN 101 include a Serving GPRS Support Node 103, the Mobility Management Entity 104, a Home Subscriber Server (HSS) 105, a Serving Gate (SGW) 106, a PDN Gateway 107 and a Policy and Charging Rules Function (PCRF) Manager 108. The functionality of each of the network elements of CN 101 is well known and is not described herein. Each of the network elements of CN 101 are interconnected by well-known standardized interfaces, some of which are indicated in FIG. 1, such as interfaces S3, S4, S5, etc., although not described herein.

While CN 101 includes many logical nodes, the E-UTRAN access network 102 is formed by one node, the evolved NodeB (eNB) 110, which connects to one or more User Equipment (UE) 111, of which only one is depicted in FIG. 1. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, eNBs are normally connected to MME 104 by an S1-MME interface and to the SGW by an S1-U interface. The protocols that run between the eNBs and the UEs are generally referred to as the "AS protocols." Details of the various interfaces are well known and not described herein.

The eNB 110 hosts the PHYsical (PHY), Medium Access Control (MAC), Radio Link Control (RLC), and Packet Data Control Protocol (PDCP) layers, which are not shown in FIG. 1, and which include the functionality of user-plane header-compression and encryption. The eNB 110 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 110 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 111, generates pages for UEs 111 over the air, broadcasts system information, controls UE measurement reporting, such as the periodicity of Channel Quality Information (CQI) reports, and allocates cell-level temporary identifiers to active UEs 111. The RRC layer also executes transfer of UE context from a source eNB to a target eNB during handover, and provides integrity protection for RRC messages. Additionally, the RRC layer is responsible for the setting up and maintenance of radio bearers.

Figure 2:
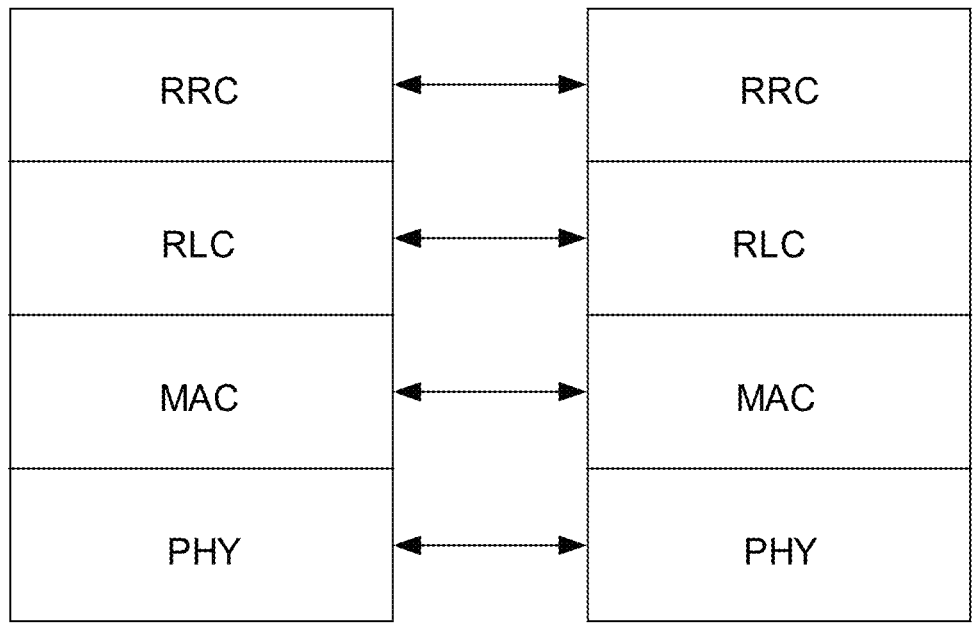
FIGS. 2 and 3 depict radio interface protocol structures between a UE and an eNodeB that are based on a 3GPP-type radio access network standard.
Figure 3:
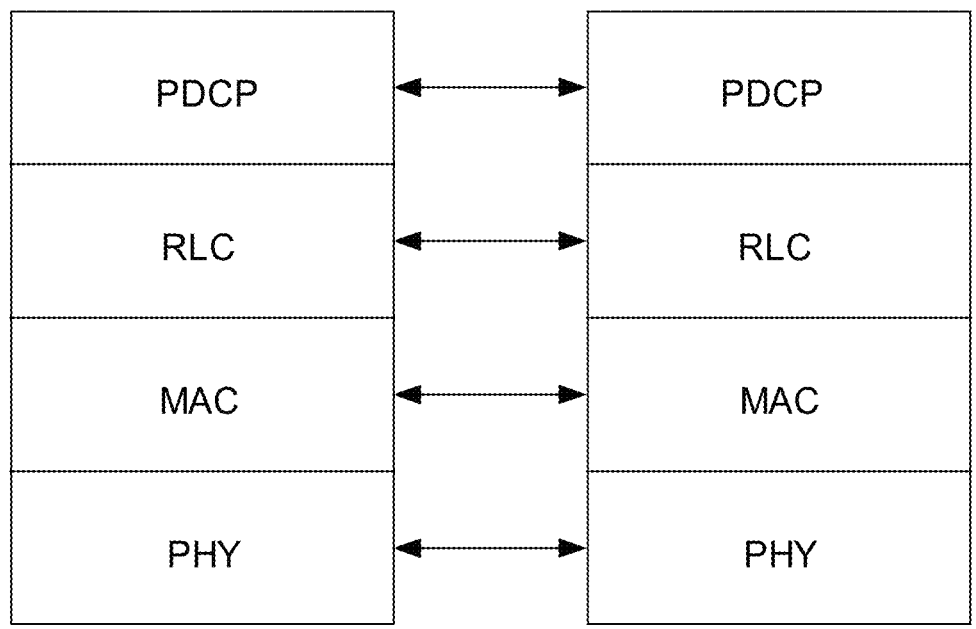

FIGS. 2 and 3 depict radio interface protocol structures between a UE and an eNodeB that are based on a 3GPP-type radio access network standard. More specifically, FIG. 2 depicts individual layers of a radio protocol control plane and FIG. 3 depicts individual layers of a radio protocol user plane. The protocol layers of FIGS. 2 and 3 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver, is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARM) ACK or NACK Scheduling Request (SR) and Channel Quality Indicator (CQI) report information, received from first and second layers (L1 and L2).

Figure 4:
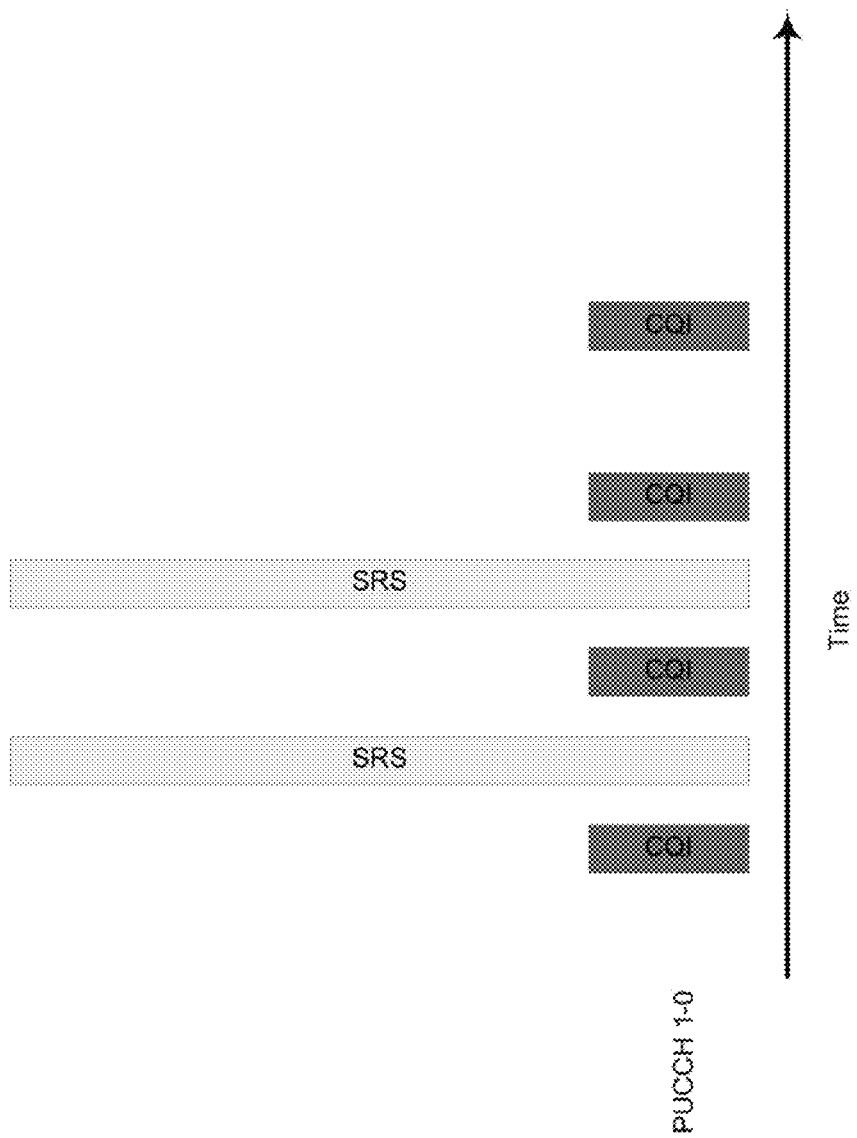
FIG. 4 depicts one possible relative timing arrangement between a Sounding Reference Signal (SRS) and a CQI sent by a UE for a Physical Uplink Control Channel (PUCCH) 2-0 CQI reporting mode.

For Rel-9 of the 3GPP LTE Technical Specification, disabling of Precoder Matrix Indictor (PMI) is supported for Transmission Mode 8 (TM8). When PMI is disabled for TM8, an eNB receives Channel Quality Information (CQI) at a receiver at the PHY layer from the UpLink (UL) control channel signaling feedback and Channel State Information (CSI) from UL sounding signals. FIG. 4 depicts one possible relative timing arrangement between a Sounding Reference Signal (SRS) and a CQI sent by a UE for a Physical Uplink Control Channel (PUCCH) 2-0 CQI reporting mode. The primary difference for Transmission Mode 9 (TM9) in comparison to TM8 is that in TM9 the channel estimation for link adaptation is generated from CSI-RS (Channel State Information—Reference Signal) instead of the Common Reference Signal (CRS).

Differences between CSI-RS and CRS include 1) CSI-RS can have maximum eight (8) ports; whereas CRS can only have maximum four (4) ports; 2) CSI-RS uses time and frequency resources relatively sparingly in comparison CRS; and 3) CSI-RS serves only as reference signal for channel estimation for link adaptation; whereas CRS provides additional functionality, such as a demodulation reference signal for PDCCH, an interference measurement, and a demodulation reference signal for Transmission Modes TM1-TM6.

Thus, if an eNB is operating mainly in TM8, it is beneficial for the eNB to have a fewer number of CRS ports than the number of transmission antennas because the reduction in overhead provided by using CRS for channel estimation for link adaptation benefits overall system throughput. That is, an eNB could configure only two CRS ports, for example, but could actually use eight (8) transmission antennas to beamform PDSCH in TM8.

In contrast to TM8, if an eNB is operating mainly in TM9, the eNB is capable of configuring the number of CSI-RS ports to be the same as the number of transmission antennas being used because the increased overhead associated with CSI-RS would be of a lesser concern. A TM9 UE often expects to see the full channel from CSI-RS, whereas a TM8 UE would often expect to see a downlink channel with reduced column vector. For TM9, because a UE often expects to see the full downlink channel from CSI-RS, a better way to estimate downlink CQI, particularly when the total number of downlink transmission antennas are 4 or 8, is to perform link adaptation using CSI-RS for channel estimation.

Document R1-100853, "Channel reciprocity in FDD systems including systems with large duplex distance," Ericsson, ST-Ericsson, RAN1 60 discloses that channel reciprocity exists not only in Time Division Duplexing (TDD), but also in Frequency Division Duplexing (FDD) when a channel covariance matrix is used to describe the spatial attributes. In comparison to instantaneous channel reciprocity, covariance reciprocity is much more robust to channel estimation errors and exists in both FDD and TDD. Accordingly, a UE can utilize this reciprocal attribute of the covariance matrix to report beamformed CQI without using a PMI report. For example, when a TM9 UE is reporting CQI using PUCCH 1-0, the UE can first estimate the downlink full channel matrix $H_i$ for each subcarrier and then by averaging, the UE can determine the wideband instantaneous channel covariance matrix $R = \text{mean\_over\_i}(H_i^T \cdot H_i)$ over all subcarriers. The rank-1 precoder can be determined by the UE from the wideband instantaneous channel covariance matrix R by, for example, using a Singular Value Decomposition (SVD) technique and obtaining the precoder from the principle eigenvector. The UE would compute the rank-1 CQI assuming that the determined precoder is used to beamform the Physical Downlink Shared Channel (PDSCH) transmission.

Alternatively, a beamformed CQI could be determined based on the Demodulation Reference Signal (DMRS), which is used to estimate the channel for data demodulation. When a UE is working in one-layer beamforming, the UE uses one DMRS port to estimate a one-column effective channel. The UE determines the CQI from the effective channel without assuming any precoder being used at the eNB. Accordingly, this alternative approach is not optimal because DMRS is not always available and a Multiple User/Single User (MU/SU) MIMO configuration is transparent to UE. Thus, for a UE to assume that a PDSCH transmission will be the same as a previous PDSCH transmission is not necessarily a good assumption.

At the eNB, a beamformed CQI is received at a PHY layer receiver from the UE feedback channel and an estimator at a higher layer of the eNB, such as, but not limited to the RRC layer, is be able to estimate an UL channel covariance matrix from the UE sounding sequence and thereby compute the precoder accordingly. Such an estimator could be embodied as a dedicated device or as firmware that is executed by a processor-type device. In comparison with non-beamformed CQI, a beamformed CQI will have better match with the precoder determined by eNodeB from UL Sounding Reference Signals (SRS).

According to the subject matter disclosed herein, if a TM9 UE is configured without PMI/RI reporting and if the number of CSI-RS antenna ports is one, then the single-antenna port is defined to be port 15. Accordingly, a transmitter at the physical layer that is coupled to the estimator transmits to the UE in TM9 based on the estimated channel using a single-antenna port defined to be port 15. If the number of CSI-RS antenna ports is two, then transmit diversity is used. The transmitter transmits to the UE in TM9 based on the estimated channel using transmit diversity. Otherwise, spatial multiplexing is used based on a rank-1 precoder that is determined from the wideband channel covariance matrix R and the transmitter transmits to the UE in TM9 based on the estimated channel using spatial multiplexing that is based on the rank-1 precoder.

Although the claimed subject matter has been described with a certain degree of particularity, it should be recognized that elements thereof may be altered by persons skilled in the art without departing from the spirit and/or scope of claimed subject matter. The claimed subject matter will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
  receiving at a base station a Sounding Reference Signal (SRS) having Precoder Matrix Indicator (PMI) reporting disabled;
  estimating at the base station a channel between the base station and a wireless station for link adaptation of a downlink signal in Transmission Mode 9 (TM9) based on the received SRS;
  transmitting from the base station to the wireless station the downlink signal in the TM9 based on the estimated channel using a predetermined single antenna port if a value of a number of Channel State Information-Reference Signal (CSI-RS) antenna ports equals one; and transmitting from the base station to the wireless station the downlink signals in the TM9 based on the estimated channel using spatial multiplexing based on a rank-1 precoder determined from a wideband channel covariance matrix R if the number of CSI-RS antenna ports does not equal one or two.

2. The method according to claim 1, further comprising transmitting from the base station to the wireless station the downlink signals in the TM9 based on the estimated channel using transmit diversity if the number of CSI-RS antenna ports equals two.

3. The method according to claim 2, wherein the predetermined single antenna port is defined to be port 15.

4. The method according to claim 3, wherein the wideband channel covariance matrix R comprises $$R = \text{Mean\_over\_}i(H_i^T \cdot H_i)$$

in which $H_i$ is a downlink full channel matrix for an ith subcarrier, and $H_i^T$ is the transpose of $H_i$.

5. The method according to claim 4, wherein a receiver at a physical layer of the base station receives the SRS from the wireless station, and wherein a transmitter at the physical layer of the base station transmits the downlink signals from the base station to the wireless station.

6. The method according to claim 5, wherein the base station comprises an evolved Node B (eNB) in a 3GPP LTE-based network, and wherein the wireless station comprises a User Equipment (UE) device.

7. A node, comprising:

a physical-layer receiver capable of receiving a Sounding Reference Signal (SRS) in an uplink signal from a wireless station configured to have Precoder Matrix Indicator (PMI) reporting disabled; and an estimator coupled to the physical-layer receiver and capable of estimating a channel between the node and a wireless station for link adaptation for a downlink signal in Transmission Mode 9 (TM9) based on the received SRS, in which:

if a value of a number of Channel State Information-Reference Signal (CSI-RS) antenna ports equals one, the node will transmit to the wireless station the downlink signal in the TM9 based on the estimated channel using a predetermined single antenna port, and if the value of the number of CSI-RS antenna ports does not equal one or two, then the node will transmit to the wireless station the downlink signal in the TM9 based on the estimated channel using spatial multiplexing based on a rank-1 precoder that is determined from a wideband channel covariance matrix R.

8. The node according to claim 7, further comprising a transmitter capable of transmitting to the wireless station the downlink signal in the TM9 based on the estimated channel using the predetermined single antenna port if the value of the number of CSI-RS antenna ports equals one.

9. The node according to claim 8, wherein if the value the number of CSI-RS antenna ports equals two, then the node will transmit to the wireless station the downlink signal in the TM9 based on the estimated channel using transmit diversity, and wherein the transmitter is further capable of transmitting to the wireless station the downlink signal TM9 based on the estimated channel using the transmit diversity if the number of CSI-RS antenna ports equals two.

10. The node according to claim 9, wherein the transmitter is further capable of transmitting to the wireless station the downlink signal in TM9 based on the estimated channel using spatial multiplexing based on the rank-1 precoder that is determined from the wideband channel covariance matrix R if the number of CSI-RS antenna ports does not equal one or two.

11. The node according to claim 10, wherein the predetermined single antenna port is defined to be port 15.

12. The node according to claim 11, wherein a wideband channel covariance matrix R comprises $$R = \text{mean\_over\_}i(H_i^T \cdot H_i)$$

in which $H_i$ is the downlink full channel matrix for an ith subcarrier, and $H_i^T$ is the transpose of $H_i$.

13. The node according to claim 12, wherein the node comprises an evolved Node B (eNB) in a 3GPP LTE-based network, and wherein the wireless station comprises a User Equipment (UE) device.

14. The node according to claim 7, wherein the node comprises an evolved Node B (eNB) in a 3GPP LTE-based network, and wherein the wireless station comprises a User Equipment (UE) device.

15. A node, comprising:

a physical-layer receiver capable of receiving in an uplink signal from a wireless station a Sounding Reference Signal (SRS), the wireless station configured to have Precoder Matrix Indicator (PMI) reporting disabled;

an estimator coupled to the physical-layer receiver and capable of estimating a channel between the node and the wireless station for link adaptation of a downlink signal in Transmission Mode 9 (TM9) based on the received SRS, in which if a value if a number of Channel State Information-Reference Signal (CSI-RS) antenna ports equals one, the node will transmit to the wireless station the downlink signal in the TM9 based on the estimated channel using a predetermined single antenna port, and if the number of CSI-RS antenna ports does not equal one or two, then the node will transmit to the wireless station the downlink signal in the TM9 based on the estimated channel using spatial multiplexing based on a rank-1 precoder that is determined from a wideband channel covariance matrix R; and a transmitter capable of transmitting to the wireless station the downlink signal in the TM9 based on the estimated channel using the predetermined single antenna port if the value of the number of CSI-RS antenna ports equals one.

16. The node according to claim 15, wherein if the number of CSI-RS antenna ports equals two, then the node will transmit to the wireless station the downlink signal in the TM9 based on the estimated channel using transmit diversity, and the transmitter is further capable of transmitting to the wireless station the downlink signal in TM9 based on the estimated channel using transmit diversity if the number of CSI-RS antenna ports equals two, and Wherein the transmitter is further capable of transmitting to the wireless station the downlink signal in TM9 based on the estimated channel using spatial multiplexing based on a rank-1 precoder that is determined from the wideband channel covariance matrix R if the number of CSI-RS antenna ports does not equal one or two.

17. The node according to claim 16, wherein the node comprises an evolved Node B (eNB) in a 3GPP LTE-based network, and
wherein the wireless station comprises a User Equipment (UE) device.

* * * * *